No. 867,854. PATENTED OCT. 8, 1907.
T. THORP.
ROTARY GAS METER.
APPLICATION FILED JUNE 5, 1906.

2 SHEETS—SHEET 1.

WITNESSES
W. P. Burke
John A. Perewial

INVENTOR
Thomas Thorp
By Richard
ATTY'S.

No. 867,854. PATENTED OCT 8, 1907.
T. THORP.
ROTARY GAS METER.
APPLICATION FILED JUNE 5, 1906.

2 SHEETS—SHEET 2.

WITNESSES
W. P. Burke

INVENTOR
Thomas Thorp
By Richards
ATTYS.

UNITED STATES PATENT OFFICE.

THOMAS THORP, OF WHITEFIELD, NEAR MANCHESTER, ENGLAND.

ROTARY GAS-METER.

No. 867,854.　　　　Specification of Letters Patent.　　　　Patented Oct. 8, 1907.

Application filed June 5, 1906. Serial No. 320,365.

*To all whom it may concern:*

Be it known that I, THOMAS THORP, a subject of the King of Great Britain and Ireland, and a resident of Whitefield, near Manchester, in the county of Lancaster and Kingdom of Great Britain, have invented certain new and useful Improvements in Rotary Gas-Meters, of which the following is a specification.

This invention relates to rotary or inferential gas meters of the kind for which Letters Patent No. 732385 have been granted to me and consists in improvements thereon which are applicable to meters passing large volumes of gas comparatively to their size. In such cases, where the current of gas has a high velocity, and where accurate registration is only required for quantities exceeding a minimum percentage, say 10 per cent, of the maximum quantity the meter is capable of passing, I have found that the inlet valve at the bottom of the cylindrical chamber and auxiliary jets acting on the outer part of the wheel vanes may be dispensed with, provided the flow of gas through the chamber on to the wheel vanes is perfectly uniform over their entire area. This may to a certain extent be obtained by causing the gas to flow through perforated plates or their equivalents into the measuring chamber, but not sufficiently so.

The object of the present invention is to obtain practical accuracy in such meters for any rate of flow the meter is constructed for.

Figure 1:
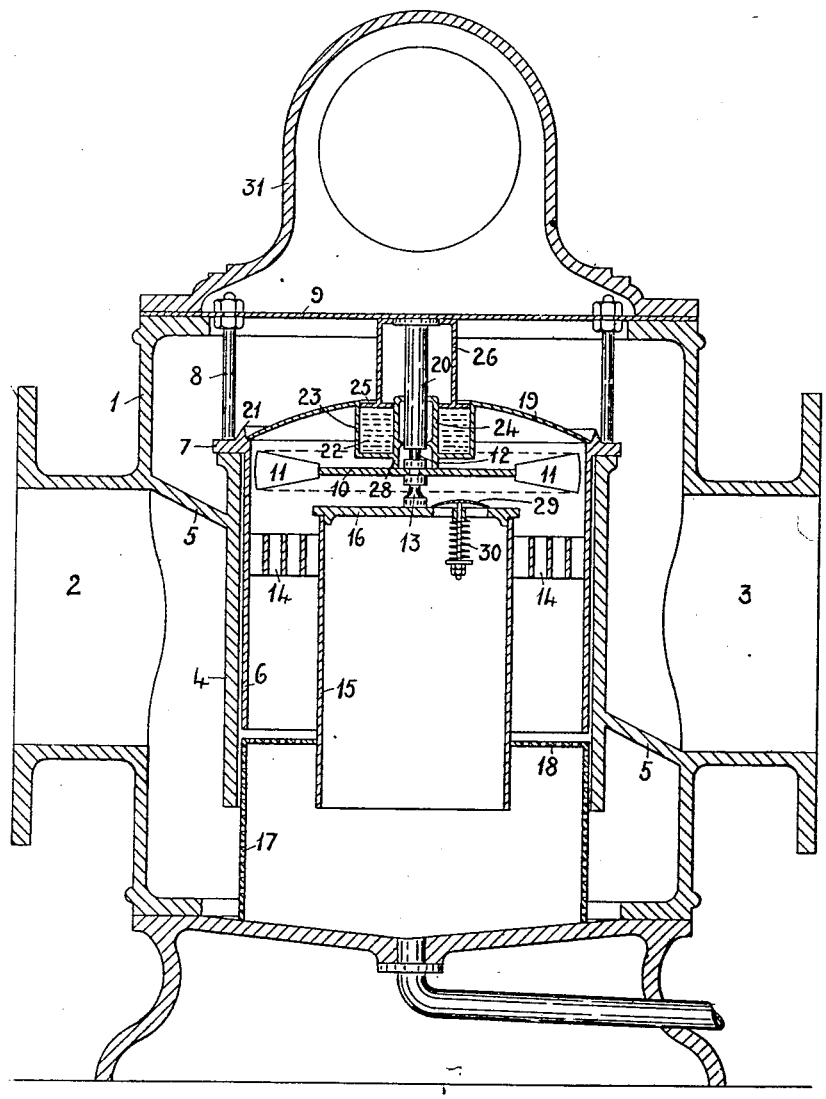
Figure 2:
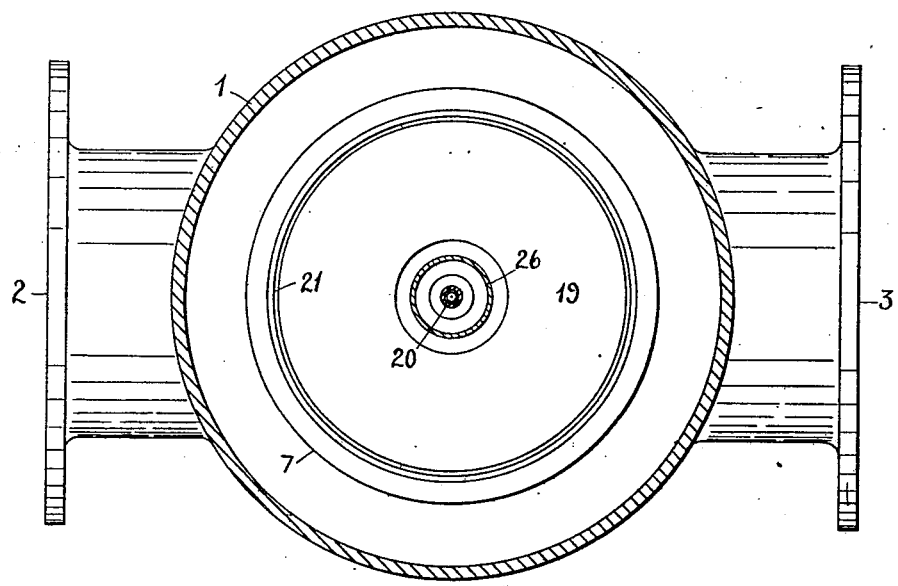
Figure 3:
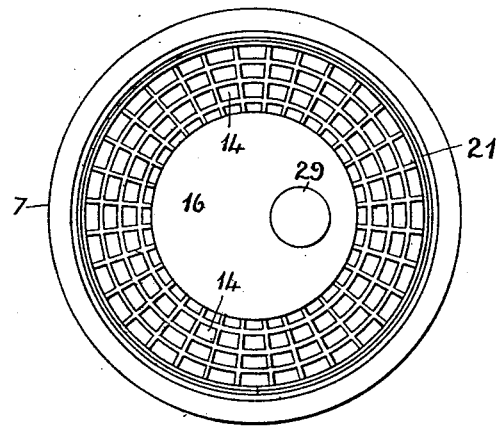

In the drawings, Figure 1 shows a sectional view, Fig. 2 shows a horizontal section below the top plate of the meter. Fig. 3 is a plan of the measuring cylinder with the top valve fan wheel and its pivot pin removed.

In the center of the casing 1 provided with an inlet branch 2 and outlet branch 3, a cylinder 4 and a partition plate 5 between the branches are arranged as before. Into the cylinder 4 the smaller cylinder 6 provided with a flange 7 is inserted and secured by means of the screwed studs 8 fixed to the plate 9 which carries the registering mechanism. In the upper part a turbine or fan wheel is arranged, having a central disk 10 and inclined blades 11, and is fixed on the spindle 12 supported in a footbearing 13. Below the vanes are the annularly arranged guide passages 14 for the gas, in the center of which is an internal cylinder 15 closed at the top by a solid baffle or disk 16 extending under the fan wheel disk 10. At the bottom of the cylinder 4 and in the same, perforated screens are arranged to obtain an equalized flow of the gas into the cylinder 6, which may consist of a perforated cylinder 17 filling the space between the bottom of the casing and the cylinder 4, and a horizontal annular perforated plate 18 between the cylinders 4 and 15, or said screens may be arranged in any other suitable way, and the perforations may be more numerous or larger on the side towards the outlet 3 than on the side of the inlet 2, in order to equalize the flow of gas in the annular space between the cylinders 6 and 15. In order further to equalize the current striking the wheel vanes 11, a large light valve 19 is arranged covering the top of the cylinder 6 which valve is guided on the sleeve 20 fixed to the plate 9 and surrounding the spindle 12 of the fan wheel or in any other suitable way, and is surrounded by a projecting ledge 21 formed on the flange 7 of the cylinder 6.

To the valve 19 an annular dashpot 22 is fixed, consisting of an outer cylinder 23 and an inner cylinder 24 which is guided on the sleeve 20, while an annular piston 25 formed on a tube 26 fixed to the plate 9 slides in the annular cylinder 22 with a slight clearance or is perforated with a small hole or groove. On the bottom of the dashpot a tube 28 is formed centrally with the valve 19, which tube when the valve is down bears upon the disk 10 of the wheel, said tube being faced with leather or the like at its bottom edge. The dashpot may be filled with a liquid or only with gas, and may be arranged in any other suitable way.

In the plate 16 closing the top of the cylinder 15 an opening closed by a valve 29 is arranged, the valve being loaded by a helical spring 30, which is preferably made adjustable. On the top of plate 9 the registering mechanism and index dials are arranged and inclosed in the cover 31. These are not shown or described as they may be arranged in any usual way and do not form part of this invention.

When the gas is admitted to the meter through the inlet 2, it passes through the perforated cylinder 17 and plate 18 into the annular space between the cylinders 6 and 15, through the guide passages 14 and lifting the valve 19, to the outlet 3, and the fan wheel is rotated by the current of gas striking the inclined blades 11. As by means of the valve the outlet from the cylinder 6 is made of the same size all round the periphery the flow of the gas current through the vanes is thereby further rendered uniform all round as if there should be a stronger flow or greater pressure in one place, it will be checked by the outlet opening, and the meter will thus register the quantities passing at various speeds correctly except for the small differences hereinafter referred to, while allowing larger volumes to pass for the same size of meter than a meter constructed with an inlet valve at the bottom as described in the specification for my said Letters Patent No. 732385.

As the speed of the gas current is considerable in this meter, the fan wheel revolves at a correspondingly high velocity and as it is mounted so as to rotate with hardly any friction in its spindle bearings, the fan wheel would continue to rotate for a considerable time after the gas supply has ceased and register gas that has not passed, unless its rotation were checked. This is done by the tube 28, which acts as a brake by dropping upon the disk 10 when the valve 19 closes. The valve need not rest upon the flange 7 when the tube rests upon the disk, as a tight closure of the valve is not required, and the ledge 21 is provided so that the valve has to lift to a greater height to afford the required outlet opening for the gas current and thus prevents the tube 28 from touching the disk 10 during the working of the meter in consequence of variations or pulsations in the flow of the gas. To further check the up and down movement of the valve during such pulsations the dashpot 22 is arranged, which retards the movement of the valve in either direction and causes it to assume a mean position during such pulsations and only to rise or drop when the average quantity of gas passing the meter per unit of time increases or decreases.

With these arrangements the meter registers quantities from its maximum capacity to 10 per cent of the same for instance from 10,000 cubic feet per hour to 1000 cubic feet, within very small limits of error, which are further reduced by means of the valve 29.

When the meter passes the maximum quantity it is constructed for, the difference of the pressure on the outlet side above the guide passages and that on the inlet side under the passages is greater than when it passes a less quantity. For instance, when passing 10,000 cubic feet per hour the difference is about 10/10 of an inch of water, while for 5,000 cubic feet it will only be about 4/10, for 3000 feet, 2/10 and for 1000 feet, 1/10. In consequence of this increased difference of pressure the meter if it correctly registers the minimum quantity passing, will register more than the actual quantity passing for the larger hourly quantities in consequence of the greater acceleration of the jets striking the vanes. For example if a certain meter for a certain gas pressure will actually pass 100 cubic feet for each 100 cubic feet registered at the rate of 1000 feet per hour, it would only pass 99 feet for each 100 registered at the rate of 3000 feet, 98 at 50 feet and 97 at 10000 feet per hour. Now by so proportioning the size of valve 29 and adjusting the spring 30 that the valve remains closed for a difference of 1/10 inch, rises sufficiently to allow 1 per cent of the quantity of gas to pass through it for a difference of 2/10 inch, 2 per cent for a difference of 4/10 and 3 per cent for a difference of 10/10, the quantities actually passing for each 100 cubic feet registered would be:

At the rate of 1000 cubic feet per hour ............ 100 cub. ft.
"  "   "   "  3000   "     "   "   "  ..... 99+1=100  "   "
"  "   "   "  5000   "     "   "   "  ..... 98+2=100  "   "
"  "   "   "  10000  "     "   "   "  ..... 97+3=100  "   "

That is to say the registration would be quite correct for all rates of flow. Even if this cannot be perfectly obtained in each case, nevertheless by suitably proportioning the size of the valve and strength of the spring, the errors of registration can be reduced within the smallest limits demanded in practice in such meters intended for gas and air measurements.

I claim as my invention.

1. In a rotary gas meter the combination of an open ended cylinder through which the gas is compelled to pass, a second internal cylinder concentric with the first, closed at the top, and having an annular space between itself and the cylinder and having tubular guide passages in the said annular space between the two cylinders, a wheel in the first cylinder having a solid central disk and outer inclined vanes above said guide passages, and a lifting valve covering the top of the first cylinder.

2. In a rotary gas meter the combination of an open ended cylinder through which the gas is compelled to pass, a second internal cylinder concentric with the first and closed at the top, and having an annular space between itself and the cylinder and having tubular guide passages in the said annular space between the two cylinders, a wheel in the first cylinder above the top of the second cylinder, having a central solid disk and outer inclined vanes above said guide passages, a lifting valve covering the top of the first cylinder, and means for retarding the movement of the valve in either direction.

3. In a rotary gas meter the combination of an open ended cylinder through which the gas is compelled to pass, a second internal cylinder concentric with the first and closed at the top, and having an annular space between itself and the cylinder and having tubular guide passages in the said annular space between the two cylinders, a wheel in the first cylinder above the top of the second cylinder, having a central disk and outer inclined vanes, a lifting valve covering the outlet from the first cylinder, means for retarding the movement of the valve in either direction, and a brake operated by the valve and adapted to arrest the rotation of the wheel when the valve closes.

4. In a gas meter the combination of an open ended cylinder, means for compelling the gas to pass through said cylinder, a second internal cylinder concentric with the first and closed at the top, and having an annular space between itself and the cylinder and having tubular guide passages in the said annular space between the two cylinders, a wheel in the first cylinder above the top of the second cylinder having a central disk and inclined outer vanes, a lifting valve covering the outlet from the first cylinder, a dashpot connected to the valve, and a tube depending from the center of the valve and adapted to rest upon the disk of the wheel when the valve is closed.

5. In a rotary gas meter the combination of a wheel having inclined vanes, a cylinder having its outlet end surrounding said wheel, and a lifting valve adapted to close the outlet end of the cylinder so as to regulate the flow of gas over the vanes.

6. In a rotary gas meter the combination of a wheel with inclined vanes, a cylinder having its outlet end surrounding said wheel, a lifting valve adapted to close the outlet end of the cylinder so as to control the flow of gas over the vanes and perforated screens between the other end of the cylinder and the inlet to the meter.

7. In a rotary gas meter the combination of an open ended cylinder in the center of the meter casing, a second internal cylinder concentric with the first open at the bottom and closed at the top, said cylinders having guide passages arranged between them, a wheel in the first cylinder having a solid central disk and outer inclined vanes above said guide passages, said internal cylinder having an opening in its top, a valve adapted to close said opening and a spring adapted to press the valve upon its seating.

8. In a rotary gas meter the combination of an open ended cylinder inside the casing, means for introducing the gas at the low end of said cylinder, a second internal cylinder concentric with the first open at the bottom and closed at the top, said cylinders having tubular guide passages arranged between them, a wheel in the first cylinder having a solid central disk and outer inclined vanes above the guide passages, said internal cylinder having an opening in the top thereof, a valve adapted to close said opening, a spring adapted to press the valve on its seating, a lifting valve covering the outlet from the first cylinder, means for retarding the motion of this valve in either direction and a brake operated by said valve and adapted to arrest the rotation of the wheel when the valve closes.

9. In a rotary gas meter the combination of a casing, an open ended cylinder inside the casing, means for introducing the gas at the lower end of said cylinder, a second internal cylinder concentric with the first open at the bottom and closed at the top, said cylinders having tubular guide passages between them, a wheel in the first cylinder having a solid central disk and inclined vanes above the guide passages, said internal cylinder having an opening in the top thereof, a spring loaded valve closing said opening, a lifting valve covering the top of the first cylinder, a dashpot connected to this valve and a tube depending from the valve and adapted to bear upon the wheel disk when the valve is closed.

10. In a rotary gas meter the combination of a casing an open ended cylinder in the center thereof, means for introducing the gas at the lower end of the cylinder, a second internal cylinder, concentric with the first open at the bottom and closed at the top, an annular plate between the cylinders and tubular guide passages through the same, a wheel in the first cylinder having a solid center and inclined vanes above the guide passages, said internal cylinder having an opening thereof, a valve adapted to close the same and a spring adapted to close the valve, a lifting valve covering the top of the first cylinder, a top plate covering the gas chamber, a tube attached to said plate and an annular piston carried by said tube, an annular cylinder carried by the said lifting valve in which cylinder said piston slides, a tube attached to the underside of the cylinder and adapted to bear upon the disk of the wheel when the valve is closed, and perforated screens between the cylinders and the gas inlet.

11. In a rotary gas meter, the combination of a cylinder through which the gas passes, a wheel in said cylinder having inclined vanes subjected to the current of gas, and a lifting valve covering the outlet end of the cylinder, substantially as and for the purposes described.

12. In a rotary gas meter, a cylinder through which the gas flows, a wheel in said cylinder near the outlet end thereof and having inclined vanes in the path of flow of the gas, in combination with a lifting valve covering the outlet from the cylinder and being of substantially the same size as the vane-wheel and means for retarding the movement of the valve in either direction.

In testimony whereof I have hereunto set my signature in the presence of two witnesses.

THOMAS THORP.

Witnesses:
REDLEY J. URQUHART,
CARL BOLLÉ.